United States Patent Office 3,515,677
Patented June 2, 1970

3,515,677
PHTHALOCYANINE-IMPREGNATED HONEY-COMBED CERAMIC CATALYST
Donald R. Pochowicz, Brookfield, Ill., assignor to Universal Oil Products Company, Des Plaines, Ill., a corporation of Delaware
No Drawing. Filed June 24, 1966, Ser. No. 560,075
Int. Cl. C10g 19/00, 27/04
U.S. Cl. 252—430    7 Claims

ABSTRACT OF THE DISCLOSURE

An improved catalyst composite comprising honeycombed ceramic impregnated with a phthalocyanine compound, such as cobalt phthalocyanine fulfonate. These catalysts are useful in the oxidation of sulfhydryl compounds and in sweetening sour hydrocarbons.

---

This invention relates to a novel catalyst composite and to the use thereof for the oxidation of a sulfhydryl compound.

Oxidation of the sulfhydryl compound is effected by reacting an oxidizing agent as, for example, air with the sulfhydryl compound in the presence of a catalyst. A particularly preferred catalyst is a phthalocyanine compound and more particularly a metal phthalocyanine compound and still more particularly a sulfonated or carboxylated derivative thereof. The oxidation preferably is effected in the presence of an alkaline medium. Heretofore the catalyst was employed either as a suspension or solution in the alkaline medium as, for example, aqueous sodium or potassium hydroxide solution or as a fixed bed in which the catalyst is composited with carbon particles.

It now has been found that improved results are obtained when the catalyst is composited with a honeycombed ceramic. The honeycombed ceramic is prepared in blocks of any desired dimensions and, when composited with the phthalocyanine catalyst, produces a catalyst composite of very high surface area and with unobstructive transversal passages. These properties of the catalyst composite mutually contribute to improved oxidation of sulfhydryl compounds in that the high available surface permits ready contact of the sulfhydryl compound, oxygen, catalyst surface and alkaline medium, all of which are required for improved oxidation. The unrestricted passage of the reaction products through the catalyst block prevents over-reaction and thereby avoids undesired development of side products. This is illustrated, for example, in the case of a hydrocarbon distillate containing both easily and difficultly oxidizable mercaptans. In order to convert the difficultly oxidizable mercaptans, longer contact times would otherwise be required and this in turn results in undesired side products as, for example, reactions causing discoloration of the hydrocarbon distillate. Such undesired reactions are minimized by using the novel catalyst composite of the present invention.

In addition to the important advantages set forth above, the use of the novel catalyst composite of the present invention offers the advantage of reduced pressure drop through the catalyst bed. This is an important mechanical improvement in the operation of the process. Another important advantage is in the reduction in contact time and this, as hereinbefore set forth, results in minimizing undesired side reactions. Because of the increased surface area, the amount of catalyst composite will be lower than otherwise required.

The novel catalyst composite is used for the oxidation of a sulfhydryl compound. The sulfhydryl compound is defined as a compound containing the —SH radical. In a particularly preferred embodiment the sulfhydryl compound is hydrogen sulfide or mercaptan. While these may consist of fractions containing them in concentrations of greater than 50%, generally the sulfhydryl compound is present in minor and usually small concentrations in organic substrates. For example, mercaptans generally are present as impurities in hycrocarbon fractions, including gases and liquids, and are treated to reduce the sulfur content of the hydrocarbon fraction. This treatment is refered to as sweetening and is employed for the treatment of sour hydrocarbon distillates, including gasoline, naphtha, jet fuel, diesel fuel, furnace oil, fuel oil, kerosene, etc. In another embodiment, the hydrocarbon fraction comprises hydrocarbon gases which contain fulfhydryl compound impurity and includes methane, ethane, propane, butane and/or ethylene, propylene, butylene, or mixtures thereof. In still another embodiment, the sulfhydryl compound may be present in other organic substrates or in aqueous media.

As hereinbefore set forth, the novel catalyst composite contains a phthalocyanine catalyst. Any suitable phthalocyanine catalyst may be used and preferably comprises a metal phthalocyanine. Particularly preferred metal phthalocyanines comprise cobalt phthalocyanine and vanadium phthalocyanine. Other phthalocyanines include copper phthalocyanine, magnesium phthalocyanine, zinc phthalocyanine, titanium phthalocyanine, hafnium phthalocyanine, thorium phthalocyanine, tin phthalocyanine, chromium phthalocyanine, nickel phthalocyanine, iron phthalocyanine, palladium phthalocyanine, platinum phthalocyanine, silver phthalocyanine, etc. In a preferred embodiment the metal phthalocyanine catalyst is utilized as a derivative thereof. A particularly preferred derivative is the sulfonated derivative. Thus, a particularly preferred phthalocyanine catalyst comprises cobalt phthalocyanine sulfonate, and more particulary cobalt phthalocyanine disulfonate, which also may contain the monosulfonate. Another preferred catalyst comprises vanadium phthalocyanine sulfonate. These compounds may be obtained from any suitable source or may be prepared in any suitable manner as, for example, by reacting cobalt, vanadium or other metal phthalocyanine with fuming sulfuric acid. While the sulfonic acids are particularly preferred, it is understood that other suitable derivatives may be employed. Another suitable derivative is the carboxylated derivative which may be prepared, for example, by the action of trichloroacetic acid on the metal phthalocyanine or by the action of phosgene and aluminum chloride. In the latter reaction, the acid chloride is formed and may be converted to the desired carboxylated derivative by conventional hydrolysis.

In accordance with the present invention, the phthalocyanine catalyst is composited with a honeycombed ceramic. A number of such honeycombed ceramics are available in the open market and generally comprise alumina, silica, magnesia, zirconia, titania, etc. and more particularly a mixture of two or more of these. A particularly preferred ceramic is available commercially under the trade name of "Alsimag 701" and is believed to comprise $2MgO \cdot 2Al_2O_3 \cdot 5SiO_2$. As hereinbefore set forth, the ceramic is formed into blocks having honeycombed structure and comprises a unitary ceramic mass with unobstructive transversal passages. These may be further described as corrugated ceramic blocks. The ceramic blocks may be of any desired dimensions and will be selected with reference to the reaction chamber in which they are to be employed. The ceramic block or blocks of small size, ranging from 1 inch to 12 inches or of larger size, ranging from 1 foot to 10 feet or more in width, depth, and/or length are positioned as a fixed bed in a reaction zone. When more than one block is used, the blocks may be positioned side-by-side in the reactor and/or, when desired, one above the other. The exact number of blocks and arrangement thereof will be selected with reference to the volume of sour organic charge to be sweetened and the quantity and type of sulfhydryl compounds contained therein.

The honeycombed ceramic is impregnated with the phthalocyanine compound and particularly the metal phthalocyanine or derivative thereof in any suitable manner. In one method, a suspension or solution of the phthalocyanine compound is first prepared and the honeycombed block is soaked, suspended, dipped, immersed, etc. in the suspension or solution, or the suspension or solution is poured over, sprayed on or otherwise contacted with the ceramic block. Any suitable suspension or solution of the phthalocyanine compound may be used and may be an aqueous or nonaqueous suspension or solution. In a particularly preferred method, the suspension or solution is in alcohol, including methanol, ethanol, propanol, butanol, etc. In another method, it is a suspension or solution in ammonium hydroxide or in other alkaline compound, including sodium hydroxide, potassium hydroxide, etc. When using alcohol, it appears that part is in solution and part is in suspension. It is understood that the alcohol, ammonia or other alkaline compound may be used as an aqueous solution.

Following the above contacting of the phthalocyanine catalyst and ceramic block, the product is dried in any suitable manner, including air drying, drying in a furnace at a temperature which generally need not be above about 300° F., or in any other suitable manner. It has been found that impregnation of the ceramic block with the phthalocyanine compound is readily effected in the manner hereinabove set forth and that a stable and satisfactory composite is prepared in this manner.

In another embodiment, the ceramic block is first given a coating of carbon and then impregnated with the phthalocyanine catalyst. Any suitable carbon may be used including particularly activated carbon. Other carbons include coke, charcoal which may be obtained from any suitable source including bone char, wood charcoal, charcoal made from coconut or other nut shells, fruit pits, lamp black base, etc. The carbon may be prepared as a paste and brushed on, sprayed on or otherwise contacted with the ceramic block. In another embodiment the ceramic block may be suitably wetted and the carbon powder blown onto the ceramic block. In still another method, the carbon may be formed as a suspension in water or other suitable liquid and the ceramic block is dipped, soaked, immersed, suspended, etc. therein, or the emulsion may be poured over, sprayed on or otherwise contacted with the ceramic block. It is understood that any suitable method for coating the ceramic block with carbon may be used. Generally the coated ceramic block is dried and then impregnated with the phthalocyanine compound in the manner hereinbefore described. In other cases, coating of the ceramic block may not be necessary.

The concentration of phthalocyanine compound in the catalyst may range from 0.1% to 10% and possibly up to 25%, preferably from about 0.2% to about 5%, by weight of the catalyst composite. When employed, the carbon will be in a concentration of from about 0.5% to about 50% and preferably from about 1% to about 25% by weight of the catalyst composite.

The composite of ceramic block and phthalocyanine compound or ceramic block, carbon and phthalocyanine compound may now be used as the catalyst for effecting oxidation of the sulfhydryl compound. The oxidation advantageously is effected in the presence of an alkaline medium, including particularly an aqueous solution of sodium hydroxide or potassium hydroxide, although lithium hydroxide and cesium hydroxide may be used but are more expensive and therefore not preferred for commercial utilization. In another embodiment, the catalyst composite of ceramic block and phthalocyanine compound or ceramic block, carbon and phthalocyanine compound is washed with or soaked in an aqueous or alcoholic solution of the alkali metal hydroxide, particularly sodium hydroxide or potassium hydroxide, and then is used as a catalyst for the oxidation of the sulfhydryl compound. In this embodiment, an aqueous solution of alkali metal hydroxide is not used initially in the oxidation reaction but probably will be required after a period of operation and then may be introduced either intermittently or continuously.

The catalyst composite of the present invention also is used in the regeneration of caustic or other alkaline solution previously used to extract mercaptans from an organic substrate and particularly hydrocarbons. In this embodiment the sour hydrocarbon steram is passed into contact, generally countercurrently, with the caustic (sodium hydroxide) solution to form sodium mercaptides which are soluble in the caustic solution and thereby are separated from the hydrocarbon fraction. The caustic solution containing the mercaptides then is oxidized in the presence of the catalyst composite to form disulfides and to regenerate the caustic solution for reuse.

As hereinbefore set forth, the conversion of the sulfhydryl compound is effected by oxidation. Accordingly air, oxygen or other oxygen-containing gas is utilized in the reaction. The process may be effected in either countercurrent or concurrent passing of the charge stream, air and, when employed, caustic solution, into contact with the catalyst composite. The oxidation is effected at a mild temperature, which may range from ambient up to 300° F. or more and particularly from about 75° to about 150° F. Atmospheric pressure or superatmospheric pressure up to 1000 pounds per square inch or more may be employed. The time of contact may range from 0.5 to 48 hours or more.

The catalyst composite of the present invention is used as a fixed bed in a reaction zone, through which the reactants are passed in either upward or downward flow. In one embodiment caustic solution is continuously passed through the reaction zone, including caustic solution being recycled within the process, or the caustic solution may be supplied intermittently. When desired, additional phthalocyanine catalyst may be supplied, generally intermittently, to the reaction zone. The phthalocyanine catalyst may be supplied as a solution or suspension in caustic, alcohol, ammonium hydroxide or in any other suitable manner. When desired, the oxidation reaction is effected in the presence of alcohol and particularly methanol, which may be continuously or intermittently supplied to the reaction zone. In this embodiment, the alcohol may be used in a concentration of from about 0.5% to about 25% by weight of the sour charge stream.

The following examples are introduced to illustrate further the novelty and utility of the present invention but not with the intention of unduly limiting the same.

EXAMPLE I

The catalyst composite of this example comprises a honeycombed ceramic block impregnated with cobalt phthalocyanine sulfonate. This catalyst composite was prepared by soaking a honeycombed ceramic block of 1" by 1" by 3½" in a solution or suspension of cobalt phthalocyanine sulfonate in methanol. The ceramic block is available commercially under the tradename of "Alsimag 701" and is said to comprise $2MgO \cdot 2Al_2O_3 \cdot 5SiO_2$ and to have a specific gravity of 2.3 and a density of 0.083 lb. per cubic inch. After impregnation with the phthalocyanine compound, the composite was dried in a furnace at 250° F.

The catalyst composite prepared in the above manner was placed in a reactor of 1" by 1" by 8". The charge to the plant was a sour commercial kerosene having a mercaptan sulfur content of about 700 parts per million. The kerosene was passed at room temperature and at a flow rate of 920 cc. per minute, together with air, upwardly through the reactor. The reactor effluent was continuously recycled through the catalyst bed, and periodically a sample of the kerosene was withdrawn and the mercaptan sulfur content thereof was determined. After 60 minutes of treatment in the above manner, the mercaptan sulfur content was 192 parts per million. It was noted particularly that the phthalocyanine compound and caustic were retained on the ceramic and also that this high flow rate could be used without developing excessive pressure drop in the reactor. These results differ from the use in other systems in which it was found that the caustic appears to travel through the system as a haze. Also, it differs from other systems because of permitting the high throughput rate.

EXAMPLE II

For comparative purposes another run was made in the same manner as described in Example I except that the reactor contained a block of the ceramic which had not been composited previously with the phthalocyanine catalyst or soaked in the caustic solution. In this run 30 cc. of 8% sodium hydroxide solution and 300 parts per million of cobalt phthalocyanine sulfonate were circulated through the system along with the kerosene. After 60 minutes of operation in this manner, the sulfur content of the kerosene was 393 parts per million.

Another run made in the same manner except that an empty reactor was used. The kerosene, caustic solution and cobalt phthalocyanine solution were circulated through the system in the same manner as described above. In this operation it was found that the caustic solution was present as a haze, which requires a further coalescing treatment to destroy the haze and further treatment to prepare the caustic for reuse in the process.

EXAMPLE III

The catalyst composite of this example is prepared in substantially the same manner as described in Example I except that the ceramic block is first given a coating of activated carbon prior to impregnation with the phthalocyanine compound. The activated carbon is available commercially as a coating mix and is believed to be a composite of activated carbon with a thixotropic polymer. The coating mix is formed as an emulsion in water and the ceramic block is dipped in this emulsion, after which it is dried by heating in a furnace at 250° F. The carbon coated ceramic block then is impregnated with cobalt phthalocyanine sulfonate in the same manner as described in Example I.

The catalyst prepared in the above manner is used for the sweetening of sour gasoline. The catalyst composite is used as a fixed bed in the reaction zone. The gasoline is a commercial gasoline having a mercaptan sulfur content of about 0.02% by weight. The gasoline and air are passed upwardly through the reactor containing the catalyst composite. The run is made at a temperature of about 110° F. and a pressure of 100 p.s.i.g. The mercaptan sulfur content of the gasoline is reduced from about 0.02% to about 0.0002% by weight and the gasoline is sweet to the Doctor Test.

EXAMPLE IV

The catalyst composite of this example is vanadium phthalocyanine composited with carbon coated ceramic block and is prepared in substantially the same manner as described in Example III, except that vanadium phthalocyanine solution is used in impregnating the carbon coated ceramic block. The catalyst composite is deposited as a fixed bed in a reaction zone and is used for the sweetening of a $C_5$ hydrocarbon fraction recovered as an overhead from a depropanizer. The sweetening is effected at 100° F. and a pressure of 25 p.s.i.g. This serves to produce a $C_5$ hydrocarbon fraction which is sweet to the Doctor Test.

EXAMPLE V

This example illustrates the use of the catalyst composite of the present invention in the regeneration of a spent caustic solution which previoiusly had been used to extract mercaptans from sour gasoline. The spent caustic solution is passed together with air downwardly over the catalyst composite prepared as described in Example III at 120° F. and 100 p.s.i.g. This serves to regenerate sodium hydroxide solution for reuse in the extraction process. The disulfides formed in the regeneration are separated as an upper layer and are withdrawn from the process.

I claim as my invention:

1. A catalyst composite of honeycombed ceramic impregnated with from 0.1% to 25% by weight of a metal phthalocyanine compound selected from the group consisting of metal phthalocyanine, metal phthalocyanine sulfonate and carboxylated metal phthalocyanine.

2. The catalyst composite of claim 1 further characterized in that said honeycombed ceramic is a honeycombed block of ceramic and is impregnated with a metal phthalocyanine compound.

3. The catalyst composite of claim 1 wherein said metal phthalocyanine compound is cobalt phthalocyanine sulfonate.

4. The catalyst composite of claim 1 wherein said metal phthalocyanine compound is vanadium phthalocyanine sulfonate.

5. The catalyst composite of claim 1 further characterized in that said ceramic is coated with carbon before impregnation with the metal phthalocyanine compound.

6. The catalyst composite of claim 5 wherein said phthalocyanine compound is cobalt phthalocyanine sulfonate.

7. The catalyst composite of claim 5 wherein said pthalocyanine compound is vanadium phthalocyanine sulfonate.

References Cited

UNITED STATES PATENTS

| | | | |
|---|---|---|---|
| 2,408,164 | 9/1946 | Foster | 252—477 XR |
| 2,634,232 | 4/1953 | Houdry | 252—477 XR |
| 2,742,437 | 4/1956 | Houdry | 252—477 XR |
| 3,230,180 | 1/1966 | Larson | 252—431 |

PATRICK P. GARVIN, Primary Examiner

U.S. Cl. X.R.

208—191, 206; 252—477